(12) United States Patent
Lu et al.

(10) Patent No.: US 8,806,128 B2
(45) Date of Patent: Aug. 12, 2014

(54) SYSTEM AND METHOD FOR INFORMATION SECURITY DEVICE WITH COMPACT FLASH INTERFACE

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 64 days.

(21) Appl. No.: 12/921,002

(22) PCT Filed: Jul. 23, 2010

(86) PCT No.: PCT/CN2010/075447
§ 371 (c)(1),
(2), (4) Date: Sep. 3, 2010

(87) PCT Pub. No.: WO2011/147114
PCT Pub. Date: Dec. 1, 2011

(65) Prior Publication Data
US 2012/0096214 A1   Apr. 19, 2012

(30) Foreign Application Priority Data
May 24, 2010   (CN) .......................... 2010 1 0181408

(51) Int. Cl.
*G06F 12/14* (2006.01)
*G06F 21/00* (2013.01)

(52) U.S. Cl.
USPC .......................................... 711/115; 711/103

(58) Field of Classification Search
USPC .......................................................... 711/115
See application file for complete search history.

(56) References Cited

U.S. PATENT DOCUMENTS

| 6,618,789 B1 * | 9/2003 | Okaue et al. ................... 711/103 |
| 6,848,047 B1 * | 1/2005 | Morikawa et al. ............. 713/159 |
| 6,904,493 B2 * | 6/2005 | Chiao et al. .................... 711/103 |

(Continued)

FOREIGN PATENT DOCUMENTS

| CN | 2697726 | * | 5/2005 |
| CN | 101076161 | * | 11/2007 |
| CN | 101251878 | * | 8/2008 |
| WO | WO2007/138021 | * | 12/2007 |

OTHER PUBLICATIONS

CN101076161 Machine Translation (Description and Claims), obtained from Espacenet Patent Translate, May 7, 2013, plus English language Abstract and Drawings.*

(Continued)

*Primary Examiner* — Sanjiv Shah
*Assistant Examiner* — Glenn Gossage
(74) *Attorney, Agent, or Firm* — Crowell & Moring LLP (57) ABSTRACT

System and method for an information security device with a compact flash (CF) interface are disclosed. The information security device determines an object being operated according to an instruction sent by a host using a card reading apparatus, and performs a flash memory operation or an information security operation. The determining by the information security device of the object being operated by the host includes the control chip of the information security device determining whether the object being operated by the host with the card reading apparatus is a real section or a virtual section inside the device, wherein the real section refers to the section in the flash module of the information security device, and the virtual section is predefined in the information security chip in the information security device.

15 Claims, 4 Drawing Sheets

(56) References Cited

U.S. PATENT DOCUMENTS

| | | | |
|---|---|---|---|
| 7,305,535 B2 * | 12/2007 | Harari et al. | 711/164 |
| 2004/0177215 A1 * | 9/2004 | Nagamasa et al. | 711/103 |
| 2006/0246840 A1 * | 11/2006 | Borowski et al. | 455/41.2 |
| 2006/0265605 A1 * | 11/2006 | Ramezani | 713/193 |
| 2007/0288689 A1 * | 12/2007 | Lu et al. | 711/103 |
| 2009/0163079 A1 | 6/2009 | Nguyen | |
| 2010/0180080 A1 * | 7/2010 | Lin et al. | 711/115 |

OTHER PUBLICATIONS

CN2697726 Machine Translation (Description and Claims), obtained from Espacenet Patent Translate, May 7, 2013, plus English language Abstract and Drawings.*

CN101251878 Machine Translation (Description and Claims), obtained from Espacenet Patent Translate, May 7, 2013, plus English language Abstract and Drawings.*

International Search Report for PCT/CN2010/075447, mailed Mar. 10, 2011, 3 pages.*

* cited by examiner

SYSTEM AND METHOD FOR INFORMATION SECURITY DEVICE WITH COMPACT FLASH INTERFACE

This application is a national stage of PCT International Application No. PCT/CN2010/075447 filed Jul. 23, 2010, which claims benefit of priority to Chinese Patent Application No. 201010181408.5 filed May 24, 2010, which is expressly incorporated herein by reference in its entirety.

FIELD OF THE INVENTION

The invention relates to the information security field, in particular to a system and a method for an information security device with a Compact Flash (CF) interface.

PRIOR ART

First launched in 1994 by SanDisk®, a CF (Compact Flash) card is a portable electronic device for storing data. A CF card has PCMCIA-ATA (Personal Computer Memory Card International Association-Advanced Technology Attachment) function, which is compatible with "PCMCIA-ATA" interface, and can be connected to many common interfaces, by a card reader, such as a USB interface, FireWire® interface etc. By using flash technology, a CF card is a stable storage solution for storing data without a battery.

A CF card is comprised of two parts, a control chip and a flash module, wherein the flash module is used for storing information, and the control chip is used for connecting with a host and controlling read/write operations on the flash chip.

An information security device is an identity authenticating device, being developed in recent years, which is convenient, safe and reliable. With a strong, two-factor one-time-password-based authentication method, the device ensures the security of online authentication for a user and provides a USB interface for communication with present computers. With a built-in central processing unit (CPU), storage unit and chip operating system (COS), the information security device can store a key or digital certificate for a user and perform algorithm like encryption or decryption. Because the encryption and decryption are executed inside the information security device, it ensures that the key is not in the memory of a computer, which eliminates the possibility of the user key being intercepted by a hacker. The information security device is called a USB key as well.

However, the information security device in the prior art does not have the function of a flash module.

SUMMARY OF THE INVENTION

For extending the application scope of the information security device, an information security device with a CF interface is provided with the following solution.

A method for an information security device with a compact flash (CF) interface, includes sending an instruction to the information security device by a host using a card reading apparatus;

determining, by the information security device, an object being operated by the host, according to an instruction; wherein if the object is a flash module of the information security device, the host operates the flash module of the information security device using the card reading apparatus as normal; and if the object is an information security chip of the information security device, a control chip of the information security device controls the host to perform the information security operation on the information security chip;

or determining, using the card reading apparatus, the object being operated by the host, wherein if the object is a storage device, the host operates the flash module of the information security device by the card reading apparatus as normal; and if the object is the information security device, the host performs the information security operation on the information security chip of the information security device.

A system including a card reading apparatus and an information security device with a compact flash (CF) interface;

wherein the card reading apparatus includes an operation module and a reset module, the operation module being used for the host to perform a write or a read operation on a flash module of the information security device as normal or to perform an information security operation on the information security module of the information security device, and the reset module being used for resetting the information security device after a card reading apparatus is identified as an information security device;

wherein the information security device includes a control module, a flash module and an information security module;

wherein the control module is used for controlling the communication between the card reading apparatus and the information security device, and for controlling the working and communication among all modules inside the information security device;

wherein the flash module is used for performing a Read or Write operation on sections of the information security device;

and wherein the information security module is used for performing information security operation on the information security device and for returning the information security operation result.

Advantages: the information security device with a CF interface in accordance with the invention makes a flash module more compatible with an information security function by adding the information security module in the device with a CF interface, and therefore it extends the application scope of the information security device.

BRIEF DESCRIPTION OF THE DRAWINGS OF THE INVENTION

DETAILED DESCRIPTION OF THE PREFERRED EMBODIMENTS

The invention relates to an information security device with a CF interface. For more exactly understanding the information security device with a CF interface, an example of a CF card is described below for further description of the information security device with a CF interface. A CF card is compatible with both a PCMCIA working mode and an ATA working mode on an interface layer, being comprised of a control chip and a flash module, and is compatible with two hard disk section addressing modes of C/H/S (Cylinder/Head/Sector) and LBA (Logical Block Address), while the information security device with a CF interface is an improved device with a CF interface by adding an information security chip.

For clear understanding of the technical solution of the invention, a clear and complete description will be given in combination with drawings of embodiments of the invention. Obviously, embodiments described hereafter are only some of the embodiments of the invention, not all the described embodiments. Based on embodiments of the invention, all other embodiments within the spirit and scope of the invention should be protected.

Embodiment 1

For making clear the purpose, technical solution and advantages of the invention, a detailed description of embodiments of the invention will be given in combination with the drawings.

Figure 1:
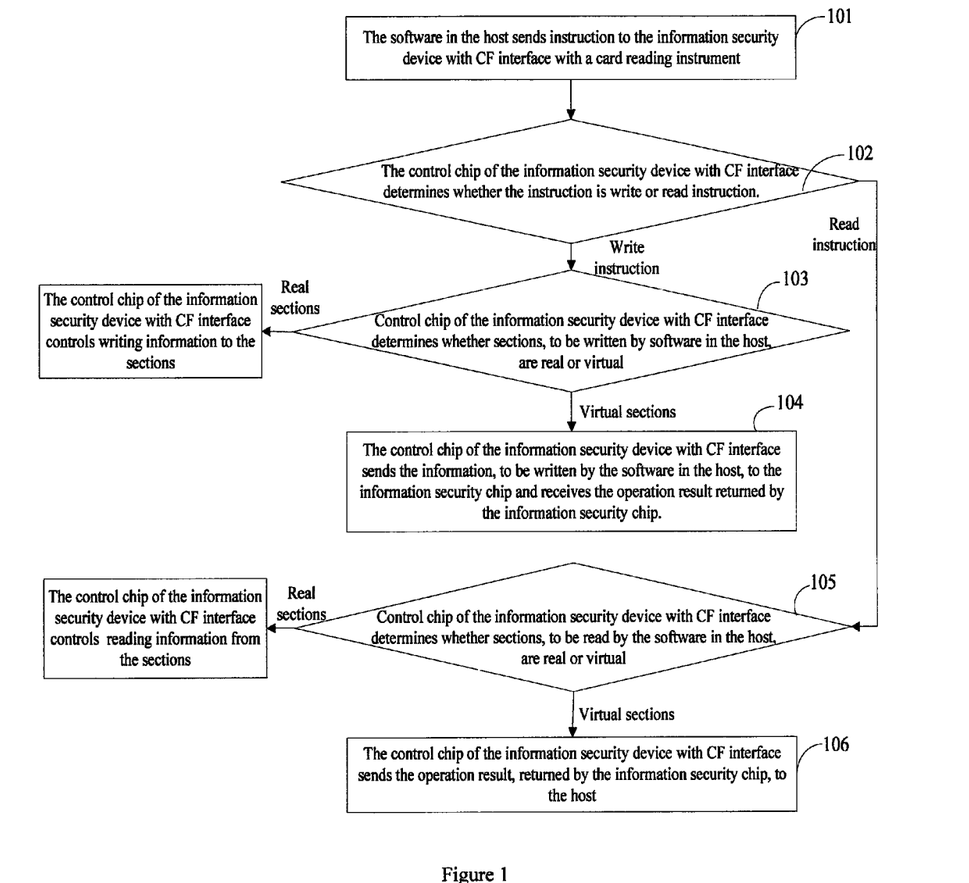
FIG. 1 is a flow chart of a method for an information security device with a CF interface in accordance with Embodiment 1 of the invention.

A method for the information security device with a CF interface is provided by embodiment 1 of the invention, as shown in FIG. 1, wherein the information security device with a CF interface is a device with a CF interface which adds an information security chip as required. In the method according to embodiment 1, in step 101, software run in a host sends instruction to the information security device with a CF interface using a card reading apparatus.

The card reading apparatus is an instrument with a CF interface, which can be a card reader with a separate CF interface or a card reading apparatus built-in the host.

In this embodiment there is a virtual section pre-defined in the information security device with a CF interface. Besides addresses of real sections, there is an address of a virtual section which does not exist physically in the information security device with a CF interface. The real sections are sections in the flash module of the information security device with a CF interface, and the virtual section which does not exist physically is the predefined section used by the interface of the information security chip. For example, there are 65536 sections in all in the information security device with a CF interface with section numbers from 0 to 65535, and thus there are 65536 real sections and one virtual section with number 65536.

So, the operation which the software, run in the host, performs on the real sections in the flash module of the information security device with a CF interface refers to a read or write operation, while the operation which the software, run in the host, performs on the virtual section of the information security device with a CF interface refers to operation on the information security chip of the information security device with a CF interface.

For example, instructions used in the embodiment are listed as below.

The upper-layer software, run in the host, sets the address line as 010 physically, which points to a section number register, and writes the instruction 0x01, which means that only one section is selected for writing, to the data line; sets the address line as 011 physically, which points to the 0-7 bit address registers in LBA addressing mode, and writes the instruction 0x00, the lower 8 bits of 65536, to the data line; sets the address line as 100, which points to the 8-15 bit address registers in LBA address mode, and writes the instruction 0x00, the middle 8 bits of 65536, to the data line.

The software sets the address line as 101, which points to the 16-23 bit address registers in LBA address mode, and writes the instruction 0x01, the upper 8 bits of 65536, to the data line; and sets the address line as 110, which points to the 24-27 bit address and drive number registers in LBA address mode, and writes the instruction 0x70, which means 0000 being added to the upper 4 bits of 65536 and the address mode LBA, rather than CHS, being selected, to the data line.

The software sets the address line as 111, which points to the command register, and writes the instruction 0x30 to the data line; and sets the address line as 000, which points to the data selecting register, and writes 0x3c, 0x04, 0x00, 0x56 and 508 bytes of 0x00 successively to the data line. Because there are 512 bytes in each section, 508 bytes of 0x00 needs to be added to the remaining section after 0x3c, 0x04, 0x00 and 0x56 are written, which is buffered in the control chip of the information security device with a CF interface by the upper layer software.

In Step 102, the control chip of the information security device with a CF interface determines whether the instruction is a read or write instruction. If the instruction is a write instruction, Step 103 is executed; and if the instruction is a read instruction, Step 105 is executed;

In detail, if the upper layer software in step 101 sets the address line as 111, and writes the instruction 0x30 to the command register, the control chip of the information security device with a CF interface determines the instruction is a write instruction, and step 103 is executed, while in practice, if the instruction 0x20 is written to the command register after the upper layer software sets the address line as 111, the information security device with a CF interface determines that the instruction is a read instruction.

In Step 103, the control chip of the information security device with a CF interface determines whether the sections that the software in the host will be written to, are real sections or virtual section, and if they are real sections, the control chip of the information security device with a CF interface controls information to be written to the real sections; otherwise, Step 104 is executed.

By setting the address lines and writing instructions to the data line successively in step 101, with the upper layer software in the host, the address line is set as 110, which points to the 24-27 bit address and drive number registers in LBA mode, and then if the instruction 0x70 is written to the data line, number of the corresponding section is 0x010000, this means that No. 65537 section of the information security device with a CF interface is a virtual section, and step 104 is executed.

The step that the control chip of the information security device with a CF interface determines whether the instruction sent by upper layer software in the host is a read or write instruction can be in front of or behind the step that the control chip of the information security device with a CF interface determines whether the instruction sent by the upper layer software in the host is performed on the real sections or virtual section.

In Step 104, the control chip of the information security device with a CF interface sends information, to be written by software in the host, to the information security chip, receives and buffers the operation result returned by the information security chip.

Specifically, if the upper layer software in the host sets the address line as 000, which points to the data register, and 0x3c, 0x04, 0x00, 0x56 and 508 bytes of 0x00 are written to the information security device with a CF interface in succession, information which the control chip of the information security device with a CF interface sends to the information security chip will be 0x3c, 0x04, 0x00, 0x56 and 508 bytes of 0x00.

In practice, the operation that the information security chip performs on the received data being sent by the control chip, can be a data exchanging operation, including encryption of the data being written in the information security device or decryption of the data being read in the information security device. Also, it can be an identity authenticating operation, including password storing or password authenticating operation, signature storing or signature authenticating operation, certificates storing or certificates authenticating operation, and privilege managing operation.

The operation that the information security chip performs can also be a computing operation for setting preset codes, wherein the preset codes include a software fragment preset for a user, which cannot be read out from the information security device and is run in the information security device for computing, and preset application interface function for protecting software, which is an interface function between the information security device and the application from a software developer, etc.

In Step 105, the control chip of the information security device with a CF interface determines whether the sections, being read by the software of the host, are real or virtual. If the sections are real, the control chip of the information security device with CF interface controls the information to be read from the sections; otherwise, step 106 is executed.

For example, read instruction is 0x20, the process of determining whether the sections being read by the software in the host are real or virtual is the same as that in step 101, and thus details are omitted.

In Step 106, the control chip of the information security device with a CF interface sends the operation result, being returned by the information security chip, to the host.

In practice, in step 104, the control chip of the information security device with a CF interface sending the information, to be written by the software in the host, to the information security chip and receiving the operation result, being returned by the information security chip, can be replaced in step 104, with the control chip of the information security device with a CF interface sending the information, to be written by the software in the host, to the information security chip, and the information security chip performing the information written and buffering it after the performing.

Correspondingly, when the process in step 105 is that the software in the host resends the instruction to read the information written, step 106 can be replaced with a step 106' in which the control chip of the information security device with a CF interface obtains the operation result of the information security chip, and returns it to the host.

In this embodiment, the instructions used are listed as below. The upper layer software run in the host sets the address line as 010 physically, which points to the section number register, and writes the instruction 0x01 to data line, which means that only one section is written to; sets the address line as 011, which points to the 0-7 bit address registers in LBA address mode, and writes the instruction 0x00 to data line, which means lower 8 bits of 65536 are selected; sets the address line as 100, which points to the 8-15 bit address registers in LBA address mode, and writes the instruction 0x00 to the data line, which means that the middle 8 bits of 65536 are selected; sets the address line as 101, which points to the 16-23 bit address registers in LBA address mode, and writes the instruction 0x01 to the data line, which means that the upper 8 bits of 65536 are selected; sets the address line 110, which points to the 24-27 bit address and drive number registers in LBA address mode, and writes the instruction 0x70 to the data line, which means that the upmost 4 bits in LBA addressing mode are made up with 0 and the LBA addressing mode rather than CHS mode is selected; and sets the address line as 111, which points to the command register, and writes the instruction 0x20 to the data line, which is a section reading instruction.

Embodiment 2

Figure 2:
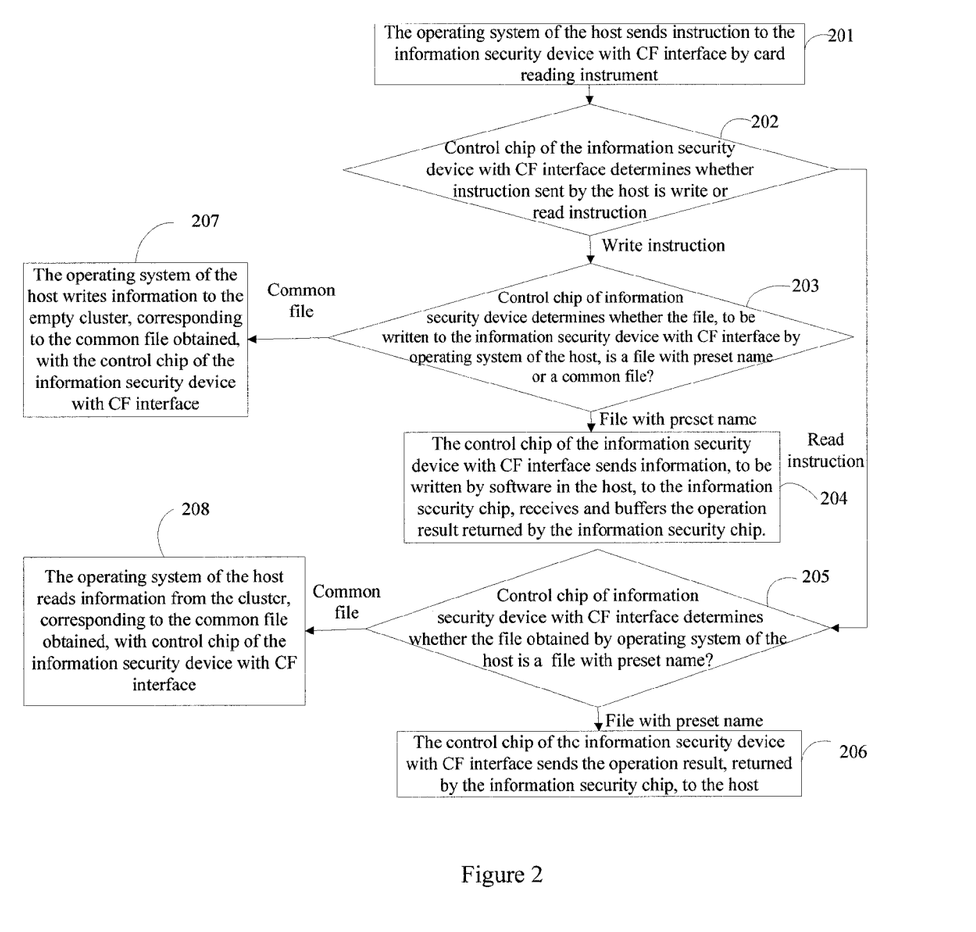
FIG. 2 is a flow chart of a method for an information security device with a CF interface in accordance with Embodiment 2 of the invention.

A method for an information security device with a CF interface is further provided by embodiment 2 of the invention, as shown in FIG. 2, wherein the information security device with a CF interface is a device with a CF interface by adding information security chip to the device with a CF interface as required, including In Step 201, the operating system of the host sends an instruction to the information security device with a CF interface using a card reading apparatus, wherein the card reading apparatus is an instrument with a CF interface, which can be a separate card reader or a card reading apparatus in the host.

In this embodiment, when the information security device with a CF interface is formatted at the factory, a file is created on disk of the information security device, which is set as a file with a preset name with or without content. The preset file with content takes larger disk space than, or same disk space as, a maximal data package being operated by the information security chip of the information security device with a CF interface. The creation of the file can be realized by a FAT (file allocation table) and FDT (file directory table), and the file created is predetermined to map, as the information security chip of the information security device, with a CF interface by both the information security device with a CF interface and the software in the host.

The FAT (File Allocation Table) is a detailed data table for recording the use of clusters in the hardware, and is an item list by which each cluster in section is mapped. With the FAT, the file is stored in linkage, because the hardware must exactly record the clusters occupied by file, provide the number of the next cluster in which the remaining content of the file is stored, for each occupied cluster, and indicate no successive cluster for the last cluster of the file.

One of the following five types of information is commonly recorded in each item of the FAT:
address of the next cluster in the linkage;
a special symbol EOF for indicating the end of the file linkage;
a special symbol for indicating damaged clusters;
a special symbol for indicating reserved clusters;
and 0 for indicating empty clusters.

FDT, File Directory Table, is an index for indicating information of the stored data, including the size, location, date and time, etc., of files stored on disk.

After the creation, the created file is available in the FDT and FAT, and in FAT, it is shown as real or virtual occupied clusters and EOF (indicating the end of the file linkage); and in FDT, it is shown as preset file name and fixed start cluster number, etc. The preset file name and fixed start cluster number are mapped as the information security chip of the information security device with a CF interface, which are different from other file and start cluster number, for example, the preset file name is mm.

If the control chip of the information security device with a CF interface obtains the preset file name and fixed start cluster number in FDT, it means that the software in the host will perform information security operation on the information security chip of the information security device with a CF interface. Because the created file is shown as real or virtual occupied clusters in the FAT, shown as preset file name and fixed start cluster number in FDT, and is different from other file name and start cluster number, it is impossible for software run in the host to operate the information security chip of the information security device with a CF interface by mistake no matter whether the software in the host writes to or reads from the information security device with a CF interface.

In this embodiment, the instructions that the operating system of the host sends to the information security device with a CF interface by the card reading apparatus include:

fp_cmd=fopen("mm", "wb"); "open the file mm in Write and Binary mode"

fwrite(output_data, sizeof(unsigned char), len, fp_cmd); "write instructions to the file, wherein the parameter output_data is an address pointer for the instructions to be written to, pointing to the address in which the instructions of 0x3c, 0x04, 0x00 and 0x56 are included, and the parameter len refers to the length of the written instructions, which matches the created file in length.

fclose(fp_cmd); "Close the file"

In Step 202, the control chip of the information security device with a CF interface determines whether the instruction sent by the host is a read or write instruction. If the instruction is write instruction, Step 203 is executed; otherwise Step 205 is executed.

In this embodiment, if in step 201, fwrite(output_data, sizeof(unsigned char), len, fp_cmd) is included in the instruction which the operation system sends to the information security device with a CF interface by the card reading apparatus, the instruction is determined to be write instruction and step 203 is executed.

If in step 201, the instruction which the operating system sends to the information security device with a CF interface using a card reading apparatus is fp_cmd=fopen("mm", "rb"); "Open the file mm in Binary and Read mode";

fread(input_data, sizeof(unsigned char), len, fp_cmd); wherein the parameter input_data is an address pointer to be received, and len refers to the length of the instruction to be received, which matches the file created in length;

fclose(fp_cmd);

the instruction is determined to be read instruction and step 205 is executed.

In the prior art, when writing information to the flash module of the information security device with a CF interface, the operating system of the host locates an empty cluster in the FAT of the information security device with a CF interface by card reading apparatus, and writes information to the empty cluster after the empty cluster is obtained; if the empty cluster is big enough to record the information to be written, the operating system of the host writes EOF, indicating the end of the file linkage, to the item corresponding to the cluster in the FAT; if the empty cluster is not big enough to record the information to be written, the operating system of the host writes the address of the next cluster to the item corresponding to the cluster, and obtains the next empty cluster to write information in FAT, and goes on performing the same operation described above and thus no detail is given herein. After the writing is finished, the operating system of the host modifies the FDT, which means recording the file name, cluster number, file size and time information etc.

In this embodiment, an information security chip is added to the information security device with a CF interface. Although the operation on the flash module or the information security chip of the information security device with a CF interface is still performed by file reading or file writing operation, it is different from that operation on the common device with a CF interface.

In step 203, the control chip of the information security device with a CF interface determines whether the file which will be written to the information security device with a CF interface by the operating system of the host is a file with a preset name or a common file. If the file is a common file, Step 207 is executed; otherwise Step 204 is executed.

In this embodiment, if the file to be written is a file with a preset name, the object which the operating system of the host performs is a control chip; and, if the file to be written is a common file, the object on which the operating system of the host performs is a flash module of the information security device with a CF interface.

Because the file mm being written in step 201 is a file with preset name, the object on which the operating system performs is the information security chip.

The control chip of the information security device with a CF interface determines whether the instruction sent by the upper layer software run in the host is a write or read instruction at first, and then determines whether the object the instruction performs is a common file or a file with preset name; or vice versa.

In Step 204, the control chip of the information security device with a CF interface sends information, to be written by the software in the host, to the information security chip and receives and buffers the operation result returned by the information security chip.

In Step 205, the control chip of the information security device with a CF interface determines whether the name of the file being found by the operating system of the host is a file with preset name, if the file is a file with preset name, Step 206 is executed; otherwise Step 208 is executed.

Taking Step 202 as an example, because the file mm to be read is a file with a preset name, the operating system of the host operates the information security chip.

In Step 206, the control chip of the information security device with a CF interface sends the operation result, being returned by the information security chip, to the host.

In practice, step 204 of the control chip of the information security device with a CF interface sending the information to be written, to the information security chip by software in the host, receiving and buffering the operation result being returned by the control chip, can be replaced with a step 204' with the control chip of the information security device with a CF interface sending information to be written, to the information security chip by the software in the host, operating the information being written and buffering the operation result.

Correspondingly, the step 206 can be replaced with a step 206' with the control chip of the information security device with a CF interface obtaining the operation result of the information security chip and returning the operation result to the host.

In Step 207, the operating system of the host writes information to the empty cluster corresponding to the common file obtained, by the control chip of the information security device with a CF interface.

In detail, if there is enough space to record the information, to be written, in the above cluster, after the control chip of the information security device with a CF interface writes the information to be written by operating system of the host, it writes EOF, indicating the end of the file linkage, to the item, corresponding to the cluster, in FAT of the information security device with a CF interface, and refreshes FAT, which means recording the file name, start cluster number, file size and time information of the file, etc.

If there is not enough space to record the information to be written in the above cluster, the control chip of the information security device with s CF interface writes information, to be written by operating system of the host, obtains another empty cluster for writing, and after the writing, it writes address of the next cluster in the item, corresponding to the cluster, in FAT of the information security device with a CF interface until all information is recorded, and writes EOF, indicating the end of the file linkage, in the item, corresponding to the cluster, in FAT, and refreshes the FDT, which means recording the file name, cluster number, file size and time information, etc.

In Step 208, the operating system in the host reads information in the clusters corresponding to the common file name obtained, with the control chip of the information security device with a CF interface.

In detail, step 208 can be realized by the information security device with a CF interface obtaining the file name and start cluster number being written, reading information from the cluster corresponding to the start cluster number, and obtaining the next cluster for reading in FAT after the file can not be finished reading in one cluster, until EOF, indicating the end of the file linkage, is shown in the item, corresponding to the cluster, in FAT.

The steps mentioned above describe the process of the operating system in the host operating the information security chip of the information security device with a CF interface, in which the operating system in the host operates the file directly, bypassing the clusters and sections, and therefore they are different from those in embodiment 1.

Embodiment 3

Figure 3:
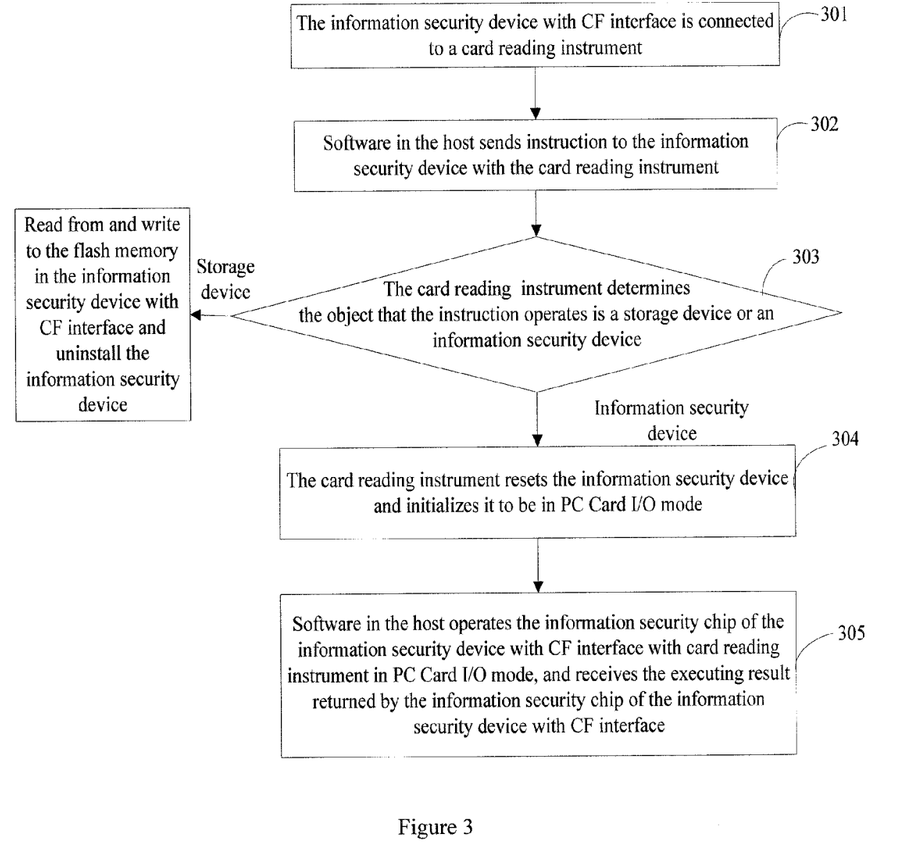
FIG. 3 is a flow chart of a method for an information security device with a CF interface in accordance with Embodiment 3 of the invention.

Another method for the information security device with a CF interface is provided by embodiment 3 of the invention, as shown in FIG. 3, the information security device with a CF interface is a device with a CF interface, which adds information security chip to the device with a CF interface as required, supporting two communication standards, True ATA (Advanced Technology Attachment) and PCMCIA (Personal Computer Memory Card International Association). The first communication standard True ATA is completely compatible with hard disk and there are two working modes for the second communication standard PCMCIA, PC Card Memory and PC Card I/O, wherein the communication timing for PC Card Memory is different from that for ATA interface while the addressing mode of it is still compatible with hard disk. So most information security devices with a CF interface for storage support both True ATA and PC Card Memory, which means that either of the two modes is used by a card reader, and therefore the operation which the operating system performs on the information security device with a CF interface is the same as that on the hard disk.

Because the PC Card I/O mode is reserved for a non-storage device which communicates with a CF interface, the information security device with a CF interface of information security function works in True ATA or PC Card Memory mode when being used for storage, while the information security device works in PC Card I/O mode after a reset by the upper layer software with card reading apparatus when used for information security operation, and then all communications are transferred to the information security chip by the control chip of the information security device with a CF interface. Specifically, the method includes the following steps.

In Step 301, the information security device with a CF interface connects to a card reading apparatus.

The card reading apparatus is an instrument with a CF interface, which can be a card reader with separate a CF interface, or a card reading apparatus built in a host which can be enumerated as both storage device and information security device by the host.

In Step 302, the software in the host sends an instruction to the information security device with a CF interface with card reading apparatus.

In Step 303, the card reading apparatus determines whether the object being operated by the instruction is a storage device or an information security device. If the object is a storage device, the card reading apparatus reads from or writes to the flash memory in the information security device with a CF interface and uninstalls the information security device. If the object is an information security device, the card reading apparatus operates the control chip in the information security device with a CF interface, at the same time, uninstalls the storage device, and step 304 as described below is executed.

In this embodiment, if the object being operated by the instruction is an information security device, the instruction can be 0x3c, 0x04, 0x00, 0x56, etc.

In detail, if the object being operated by the instruction is a storage device, this means that the card reading apparatus is used as a storage device, the software in the host operates the flash module in the information security device with a CF interface in default True ATA or PC Card Memory mode, and the Write operation is the same as that on common hard disk, which is given detailed description in embodiment 2 and therefore no details are given hereafter.

If the object, being operated by the instruction, is the information security device, this means that the card reading apparatus is identified as an information security device, the operation is more complicated with details as below.

In Step 304, the card reading apparatus resets the information security device with a CF interface and initializes it to be in PC Card I/O mode.

The process of a reset and initialization is realized by the card reading apparatus repowering the information security device with a CF interface, or sending reset impulse by Reset pin and keeping the output enable (OE) pin at high level until the information security device finishes the reset, and then writing 0, 0, 0, 0, 0 and 1 respectively to the registers config5, config4, config3, config2, config1, config0, and then the CF card works in PC Card I/O mode.

In Step 305: the software in the host operates the control chip of the information security device with CF interface in PC Card I/O mode, and receives the operation result being returned from the control chip of the information security device with a CF interface.

The operation being performed on the information security chip is the same as that in embodiment 1, and thus description of the operation is omitted hereafter.

Embodiment 4

Figure 4:
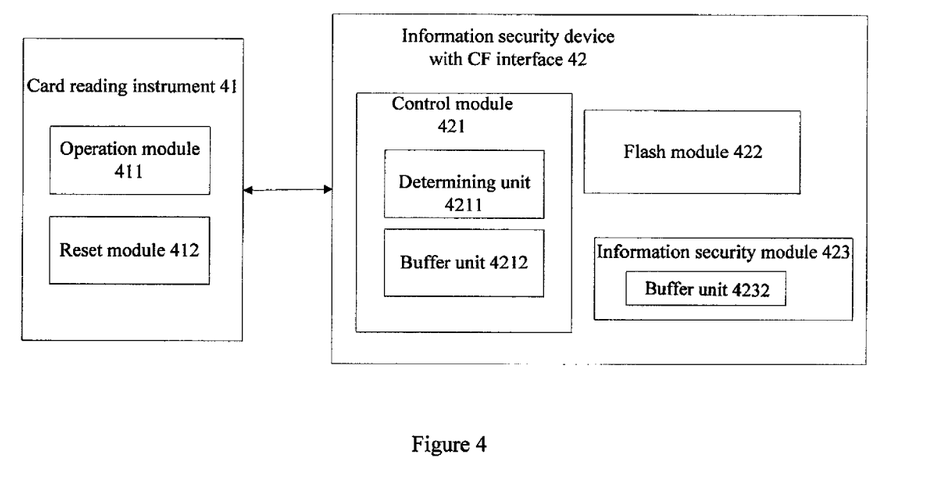
FIG. 4 is a structural diagram of a system for an information security device with a CF interface in accordance with Embodiment 4 of the invention.

A system for an information security device with a CF interface is provided by embodiment 4 of the invention, as shown in FIG. 4, including a card reading apparatus 41 and an information security device with a CF interface 42, wherein the card reading apparatus is an instrument with a CF interface or a card reader built in the host or a card reader with separate interface, being comprised of operation module 411 and reset module 412.

The operation module 411 is used for the host to perform normal read/write operation on the flash module of the information security device with a CF interface; or to perform information security operation on the information security chip of the information security device with a CF interface.

The reset module 412 is used for resetting the information security device with a CF interface according to the instruction being sent by the upper layer software in the host.

The information security device with a CF interface is comprised of a control module 421, a flash module 422 and an information security module 423.

The control module 421 is used for controlling the communication between the card reading apparatus and the information security device with a CF interface, and for controlling the working of all modules in the information security device with a CF interface and communication between the modules.

The flash module 422 is used for reading from or writing to sections of the information security device with a CF interface.

The information security module 423 is used for performing information security operation on the information security device with a CF interface and returning the operation result.

The operation module 411 and reset module 412 are built in the card reading apparatus 41, and are connected to the information security device with a CF interface 42, with a CF interface; and the control module 421 is connected to the flash module 422 with flash controller inside the control module 421 and connected to the information security module 423 with self-defined method such as Serial Peripheral Interface, Universal Asynchronous Receiver Transmitter, etc.

The control module further includes a determining unit 4211 for determining whether the operation that the card reading apparatus performs on the information security device is on the flash module or on the information security module of the information security device with a CF interface, wherein the determining can be completed by determining whether the operation that the card reading apparatus performs on the information security device with a CF interface is on real sections or on a virtual section of the information security device with a CF interface.

In detail, there is a pre-defined virtual section in the information security device with a CF interface, and therefore besides the real section addresses existing physically, there is a virtual section address, which does not exist physically, in the information security device with a CF interface, wherein the real sections are those sections in the flash module of the information security device with a CF interface, while the virtual section is the predefined section, which is identified as information security chip. The above mentioned is applicable to embodiment 1.

The determining unit 4211 is used for determining whether the operation that the card reading apparatus performs on the information security device with a CF interface is on the flash module or the information security module in the information security device with a CF interface, which can be implemented by determining whether the operation the card reading apparatus performs is on the file with preset file name or on the file with common file name in the information security device with a CF interface.

In detail, when the information security device with a CF interface is formatted before leaving the factory, it created a file, which can be set as a file with preset name without content, or a file with preset name with content which takes larger disk space than or the same disk space as a maximal data package, being operated by the information security chip of the information security device with a CF interface. The creation can be realized by FAT and FDT, and the file created is predetermined to map, as the information security chip of the information security device, with a CF interface by the information security device with a CF interface and the software in the host.

After the creation, the created file is available in the FDT and FAT, and in FAT, it is shown as real or virtual occupied clusters and EOF (indicating the end of the file linkage); and in FDT, it is shown as preset file name and fixed start cluster number, etc. The preset file name and fixed start cluster number are mapped as the information security chip of the information security device with a CF interface, which are different from other file and start cluster number.

If the control chip of the information security device with a CF interface obtains the preset file name and fixed start cluster number in FDT, the software in the host will perform information security operation on the information security chip of the information security device with a CF interface. Because the created file is shown as real or virtual occupied clusters in FAT, and shown as preset file name and fixed start cluster number in FDT, different from other file name and start cluster number, it is impossible for software being run in the host to operate the information security chip of the information security device with a CF interface by mistake whether the software in the host writes to or reads from the information security device with a CF interface.

The above mentioned is applicable to embodiment 2.

The buffer unit 4212 is used for buffering the obtained information security result returned by the information security module.

In this embodiment, the information security module 423 further includes a buffer unit 4232 for buffering the information security result after operation by the information security module 423.

In detail, in this embodiment, the card reading apparatus 41 is both a storage device and an information security device. Commonly, the card reading apparatus 41 is a storage device, and correspondingly the information security device is uninstalled, and the operation module 411 is used for the host to read from or write to the flash module in the information security device with a CF interface normally.

When the card reading apparatus is an information security device with the received instruction, being sent by the upper layer software in the host, the storage module is uninstalled, and the instruction can be 0x3c, 0x04, 0x00 and 0x56, and on this condition, the reset module 412 of the card reading apparatus 41 is used for resetting the information security device with a CF interface and for initializing it to be in PC Card I/O (input/output) mode, and the operation module 411 is used for the host to perform information security operation on the information security chip of the information security device with a CF interface. The above mentioned is applicable to embodiment 3.

In summary, the content of embodiment 4 includes the content of embodiment 1, embodiment 2 and embodiment 3. The operation module 411 in the card reading apparatus 41, the control module 421, the flash module 422 and the information security module 423 in the information security device with a CF interface, and the control module 421 including the determining unit 4211 and buffer unit 4212, are used in embodiment 1.

The operation module 411 in the card reading apparatus 41, the control module 421, the flash module 422 and the information security module 423 in the information security device with a CF interface 42, and the control module 421 including the determining unit 4211 and buffer unit 4212 are used in embodiment 2. The only difference between embodiment 1 and embodiment 2 is the function of the control module 421.

The operation module 411 and reset module 412 in the card reading apparatus 41, and the control module 421, flash module 422 and information security module 423 in the information security device with a CF interface 42 are used in embodiment 3.

Because descriptions of all functions of these modules have been given above, no further details will be given hereafter.

The information security device with a CF interface provided by embodiments of the invention, extends the application scope of the information security device by adding information security chip to the device with a CF interface.

The above mentioned are just preferred embodiments of the invention, not limitation to the invention, and all modifications, substitutions, improvements, etc, made in principles of the invention are protected by the invention.

The invention claimed is:

1. A method for an information security device with a compact flash (CF) interface, comprising:
   sending, by a host, an instruction to the information security device with the CF interface using a card reading apparatus;
   determining, by the information security device, an object being operated by the host according to the instruction; wherein
   if the object being operated by the host is a flash module of the information security device, the host operates the flash module of the information security device using the card reading apparatus as normal; and
   if the object being operated by the host is an information security chip of the information security device the host controls a control chip of the information security device to perform the information security operation on an information security chip of the information security device;
   determining, using the card reading apparatus, the object being operated by the host, wherein if the object is a storage device, the host operates the flash module of the information security device by the card reading apparatus as normal; and if the object is the information security device, the host performs the information security operation on the information security chip of the information security device,
   wherein the determining, by the information security device, the object being operated by the host comprises the control chip of the information security device determining whether the object being operated by the host with the card reading apparatus is a real section or a virtual section inside the information security device, wherein the real section refers to the section in the flash module of the information security device, and the virtual section is predefined in the information security chip in the information security device.

2. The method of claim 1, wherein the card reading apparatus is a device with a CF interface, which is built in the host or is a separate card reader.

3. The method of claim 1, wherein the determining, by the information security device, the object being operated by the host comprises the control chip of the information security device determining whether a file being operated upon by the host with the card reading apparatus, is a file with a preset name or a common file, wherein the common file is used by the flash module of the information security device, and the file with the preset name is used by the information security chip of the information security device.

4. The method of claim 3, wherein, when the information security device is formatted, the information security device creates a file on disk with a file allocation table (FAT) and a file directory table (FDT), and the created file is the created file with the preset name, and after the creating of the file with the preset name, a file name and a cluster number of the file are recorded in the FDT, wherein the file name refers to a preset file name, and the cluster number refers to a fixed start cluster number.

5. The method of claim 1, wherein, after sending, by the host, the instruction to the information security device using the card reading apparatus and before determining, by the card reading apparatus, the object being operated by the host, the method further comprises determining whether the instruction is a write instruction or a read instruction;
   correspondingly, when the host operates the flash module of the information security device using the card reading apparatus, the host performs a read operation or a write operation on the flash module of the information security device using the card reading apparatus;
   and correspondingly, when the host controls the control chip of the information security device to perform an information security operation on the information security chip of the information security device, if the instruction is a write instruction, the control chip of the information security device forwards the instruction to the control chip, receives and buffers an operation result being returned by the information security chip; and, if the instruction is a read instruction, the control chip of the information security device sends the operation result, being returned by the information security chip, to the card reading apparatus; and
   when the host controls the control chip of the information security device to perform an information security operation on the information security chip of the information security device using the card reading apparatus, if the instruction is a write instruction, the control chip of the information security device forwards the instruction to the information security chip, and the information security chip performs the information security operation and buffers the operation result; and, if the instruction is a read instruction, the control chip of the information security device receives the buffered operation result, being returned by the information security chip, and sends the buffered operation result to the card reading apparatus.

6. The method of claim 1, wherein, after determining, by the information security device, the object being operated by the host according to the instruction, the method further comprises determining whether the instruction is a write instruction or a read instruction;
   correspondingly, when the host operates the flash module of the information security device, the host performs a write operation or a read operation on the flash module of the information security device using the card reading apparatus;
   correspondingly, when the host controls the control chip of the information security device to perform an information security operation on the information security chip, if the instruction is a write instruction, the control chip of the information security device forwards the instruction to the information security chip, receives and buffers an operation result being returned by the information security chip; and, if the instruction is a read instruction, the control chip of the information security device sends the operation result, being returned by the information security chip, to the card reading apparatus;
   when the host controls a control chip of the information security device to perform an information security operation on the information security chip using the card reading apparatus, if the instruction is a write instruction, the control chip of the information security device forwards the instruction to the information security chip, and the information security chip performs an information security operation and buffers the operation result; and, if the instruction is a read instruction, the control chip of the information security device receives the buffered operation result, being returned by the control chip, and sends the buffered operation result to the card reading apparatus.

7. The method of claim 1, wherein the card reading apparatus is a device with a CF interface, which is built in the host or is a separate card reader, and is identified as both a storage device and an information security device by the host.

8. The method of claim 7, wherein, if the object being operated by the host is a storage device, the card reading apparatus is a storage device and operating the flash module of the information security device using the card reading apparatus comprises the card reading apparatus performing a write operation or a read operation on the flash module of the information security device in True Advanced Technology Attachment (ATA) or Personal Computer (PC) Card Memory mode.

9. The method of claim 7, wherein, if the object being operated by the host is an information security device, the card reading apparatus is performing an information security operation on the information security chip of the information security device comprises the card reading apparatus resetting the information security device, initializing the information security device to Personal Computer (PC) Card Input/Output (I/O) mode, and performing an information security operation on the information control chip of the information security device.

10. A system comprising a card reading apparatus and an information security device with a compact flash (CF) interface;
  wherein the card reading apparatus comprises an operation module and a reset module, the operation module being used for the host to perform a write operation or a read operation on a flash module of the information security device as normal or to perform an information security operation on an information security module of the information security device, and the reset module being used for resetting the information security device after the card reading apparatus is identified as an information security device;
  wherein the information security device comprises a control module, the flash module and the information security module;
  wherein the control module controls communication between the card reading apparatus and the information security device and determines whether the object being operated by the host with the card reading apparatus is a real section or a virtual section inside the device, wherein the real section refers to the section in the flash module of the information security device, and the virtual section is predefined in the information security module in the information security device, and controls operations and communication among all modules inside the information security device;
  wherein the flash module performs a Read operation or a Write operation on sections in the information security device;
  wherein the information security module performs an information security operation on the information security device and returns an information security operation result;
  wherein the control module comprises a determining unit for determining whether the operation performed on the information security device is an operation on the flash module or the information security module of the information security device including determining whether the object being operated by the host with the card reading apparatus is a real section or a virtual section inside the device, wherein the real section refers to the section in the flash module of the information security device; and
  the control module further comprises a buffer unit for buffering the information security operation result returned by the information security module, and the virtual section is predefined in the information security chip in the information security device.

11. The system of claim 10, wherein the card reading apparatus is a device with a CF interface, which is built in a host or is a separate card reader with a CF interface.

12. The system of claim 10, wherein the card reading apparatus is a device with a CF interface, which is identified as both a storage device and an information security device at the same time.

13. The system of claim 10, wherein the information security module is an information security chip.

14. The system of claim 10, wherein the card reading apparatus is connected to the information security device via the CF interface; and the control module is connected to the flash module via a flash controller inside the control module and is connected to the information security device by either serial peripheral interface (SPI) or a universal asynchronous receiver/transmitter (UART).

15. The system of claim 10, wherein the information security module further comprises a buffer unit for buffering the information security operation result obtained from an operation of the information security module.

* * * * *